May 15, 1945.　　　　M. SHOELD　　　　2,376,095
DEHYDRATING PROCESS
Filed Oct. 15, 1942　　　　3 Sheets-Sheet 1
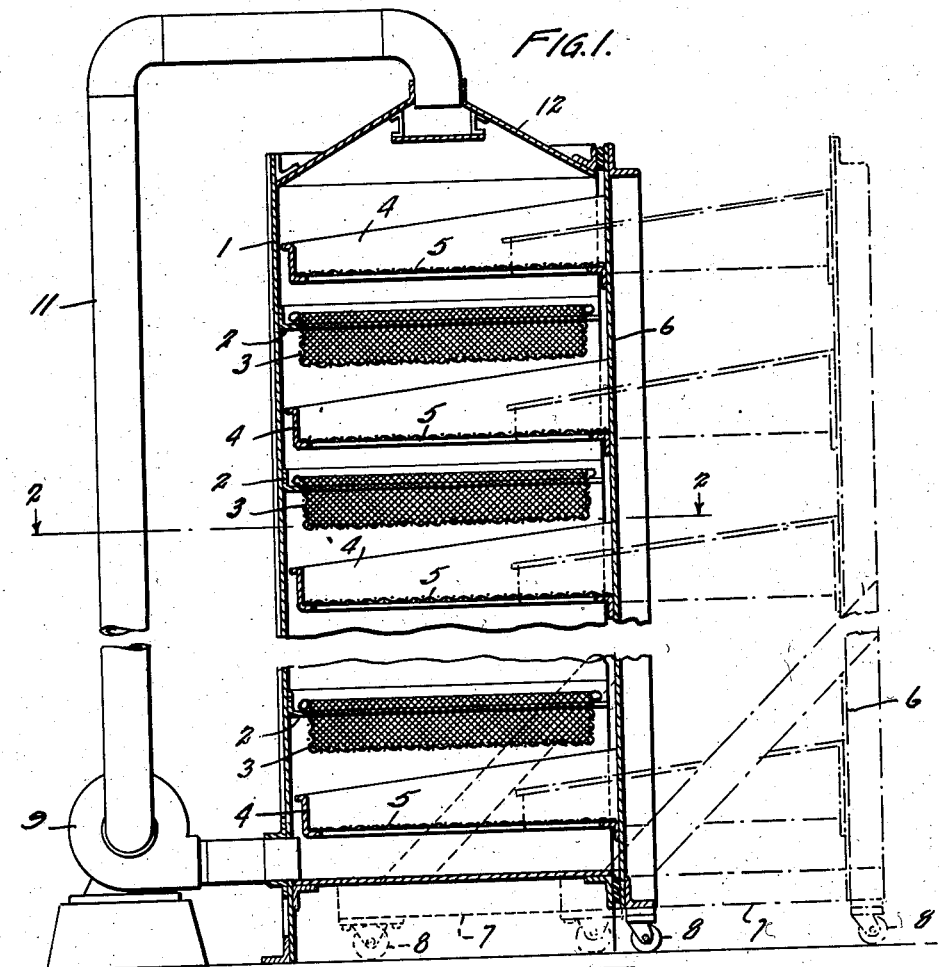
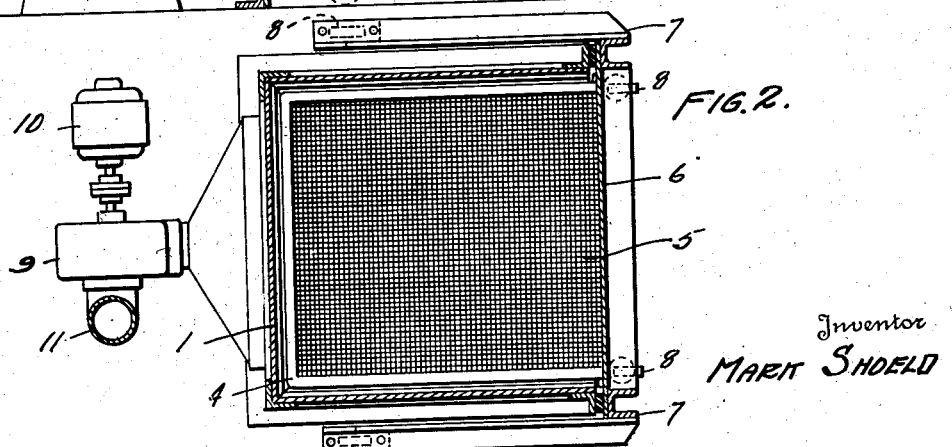
Inventor
MARK SHOELD
By Semmes, Keegin, Beale & Semmes
Attorneys

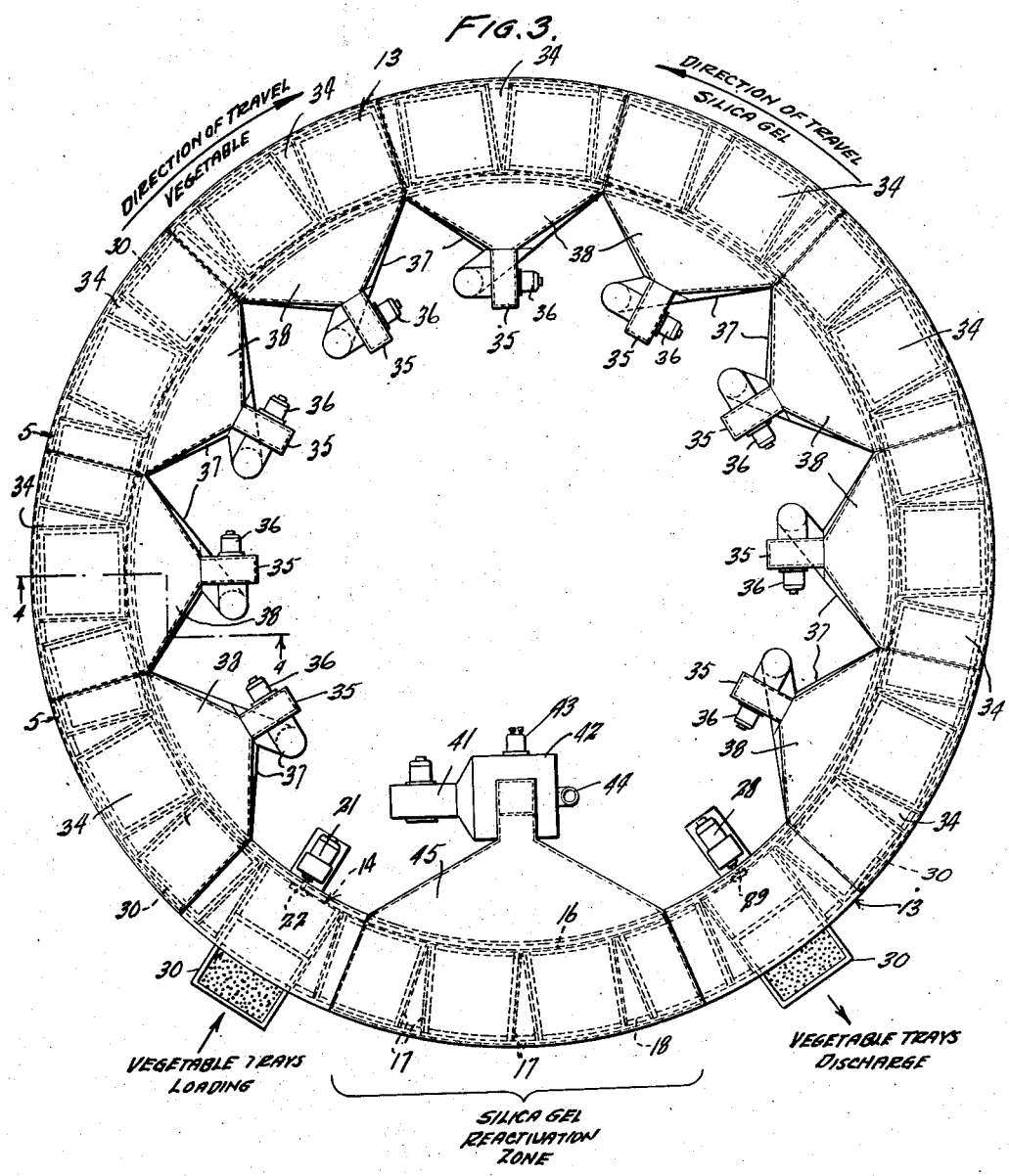

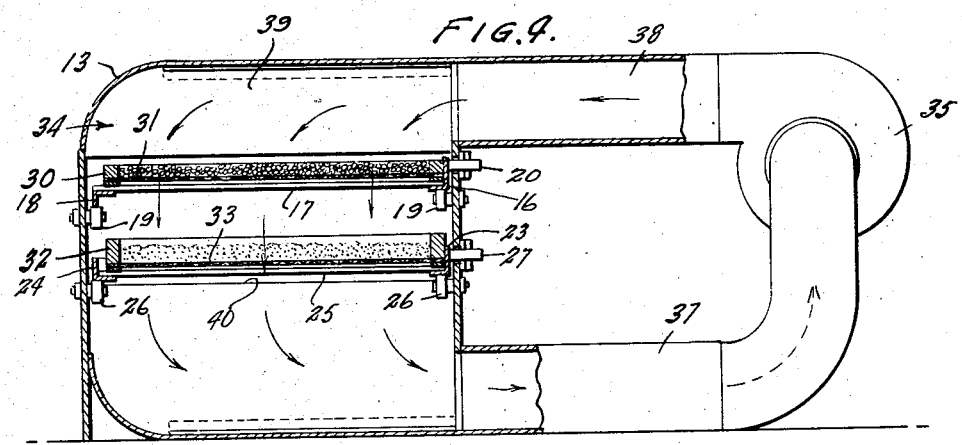

Patented May 15, 1945

2,376,095

UNITED STATES PATENT OFFICE 2,376,095

DEHYDRATING PROCESS

Mark Shoeld, Baltimore, Md., assignor to The Davison Chemical Corporation, Baltimore, Md.

Application October 15, 1942, Serial No. 462,165

1 Claim. (Cl. 34—32)

This invention relates to the dehydration of moisture-containing materials and more particularly has reference to a method of dehydrating such materials by passing a gaseous moisture carrier in contact with said materials and a solid non-deliquescing dehydrating agent.

The primary object of this invention is to make a dried or dehydrated food product, which upon hydration with water will resume its original shape, color, and flavor.

The present invention also has for an object the provision of a dehydrating process which does not remove the volatile flavor elements from the food product.

A third object of importance is to effect the dehydration of a food product at a fixed temperature during the entire drying period and in which the heat evaporated by the atmosphere of moisture from the food product by the dehydrating agent is the same as the heat required for evaporating water from the food product.

An object of this invention is to provide a method of dehydrating vegetable and other moisture-containing material by passing a gaseous moisture carrier in contact with said material and in contact with a solid nondeliquescing dehydrating agent.

Another object of this invention is to provide a method of dehydrating vegetable and other moisture-containing material by passing a gaseous moisture carrier in contact with the material and in contact with an adsorbent oxide gel.

Still another object of this invention is to provide a method of dehydrating vegetable and other moisture-containing material by passing a gaseous moisture carrier in contact with the material and in contact with silica gel.

A further object of this invention is to provide a method of dehydrating vegetable and other moisture-containing material by passing the same and a solid nondeliquescing dehydrating agent through a zone in which a gaseous moisture carrier is circulated in contact with the material and the dehydrating agent.

A still further object of this invention is to provide a method of dehydrating vegetable and other moisture-containing material by passing the material to be dehydrated and a solid non-deliquescing dehydrating agent countercurrently through a dehydrating zone and circulating a gaseous moisture carrier through said zone in contact with the material and the dehydrating agent.

It is also an object of this invention to provide a method of dehydrating vegetable and other moisture-containing material by passing a solid nondeliquescing dehydrating agent through a series of dehydrating zones and through a reactivating zone, passing a material to be dehydrated through said dehydrating zone countercurrently to the dehydrating agent so that moisture-containing material will be first passed through a dehydrating zone containing spent dehydrating agent and the partially dehydrated material will be passed through a zone in which freshly reactivated dehydrating agent is present, and circulating a gaseous moisture carrier through each of said dehydrating zones.

It is a further object of this invention to introduce into the gaseous moisture carrier used for carrying moisture from the material to the dehydrating agent small quantities of treating gases for favorably affecting the color and flavor of the material to be dehydrated.

With these and other objects in view, the present invention resides in the steps and procedures hereinafter set forth and illustrated in the figures of the accompanying drawings.

In the drawings:

Figure 1 is an elevational view partly in section of an apparatus for effecting dehydration in accordance with one phase of the present invention.

Figure 2 is a sectional view taken on line 2—2 of Figure 1.

Figure 3 is a somewhat diagrammatical plan view of another form of apparatus for carrying out another phase of the present invention.

Figure 4 is an enlarged detailed sectional view taken on line 4—4 of Figure 3.

Figure 5 is a fragmentary sectional view taken on line 5—5 of Figure 3.

Figure 6 is a fragmentary perspective view of the carriers for the material to be dehydrated and for the dehydrating agent.

In accordance with the present invention vegetable and other moisture-containing material such as peas, beans, carrots and other food products are dehydrated by maintaining the same in close proximity to and/or by circulating a gaseous moisture carrier in contact with said materials and in contact with a dehydrating agent. A number of the most commonly used dehydrating agents deliquesce upon taking up moisture and are found to be unsuitable for the dehydration of food products. A dehydrating agent suitable for operation with the present invention must be a solid which is nondeliquescent. Another point of consideration is that in the dehydration of foods, quite often the bouquet or flavoring material of the food is taken up along with moisture in the dehydration thereof. In this connection it has been found that silica gel serves very effectively as an agent for dehydrating foods and other vegetable or moisture-containing material, and in the case of foods, the silica gel has a preferential affinity for water rather than the bouquet or flavoring matter of the food.

Oxide gels other than silica gel such as alumina gels may be used for this purpose. In addition, it has been found that activated alumina, activated bauxite, and anhydrous calcium sulphate may be used for carrying out the present invention.

One method of carrying out the present invention is to maintain the material to be dehydrated in close proximity with a dehydrating agent. For this purpose, trays of the material to be dehydrated and the dehydrating agent may be maintained adjacent each other so that the moisture from the material may pass through the gaseous medium, contacting the material and the dehydrating agent, to the dehydrating agent.

It has been found that an apparatus such as shown in Figure 1 of the drawings is useful for effectively dehydrating moisture-containing materials in accordance with the principles of the present invention. As illustrated in this figure, a closed chamber 1 is provided having a plurality of racks or supporting brackets 2 on which are detachably located a plurality of trays or baskets 3 of woven, foraminous, or other open type construction. These baskets serve for maintaining the material to be dehydrated within the chamber 1.

Alternating with the trays or baskets 3 are a plurality of trays or baskets 4 in which the dehydrating agent is supported. These baskets may have imperforate side walls and may be provided with screen or other foraminous type of bottom 5 so that a gas may be circulated upwardly through the bottom and in contact with the dehydrating agent supported thereon.

The baskets 4 are supported on a wall 6 of the chamber 1 which is removable from said chamber and is independently mounted upon a carriage 7 which in turn is supported upon casters 8. This construction enables the carriage 7 and wall 6 carried thereby and on which the baskets 4 are mounted to be removed from the chamber 1 and rolled or otherwise transported to a reactivating zone in which the dehydrating agent in the baskets 4 is reactivated. During the reactivation of the material in the baskets 4 a similar carriage containing freshly reactivated dehydrating agent may be associated with the chamber 1 so that the dehydration of the moisture containing material will be substantially continuous.

As shown in Figure 1 a blower or circulating fan 9 driven by a motor 10 is provided for circulating the air or other gas upwardly in alternate contact with the dehydrating agent and the material to be dehydrated. The blower or fan 9 is provided with an inlet duct 11 which communicates through an opening in the top 12 of the chamber 1 with the interior thereof so that as the gaseous moisture carrier reaches the upper portion of the chamber, it is withdrawn by the blower 9 and reintroduced into the lower portion of the chamber. This continuous circulation of gaseous moisture carrier in alternate contact with the dehydrating agent and the material to be dehydrated serves to transfer the moisture from the material to the dehydrating agent.

While the dehydration of material in an apparatus such as shown in Figures 1 and 2 is substantially continuous, nevertheless, when the material is dried, it must be removed from the apparatus, and during this operation and until after the baskets or trays 3 have been refilled with fresh material to be dehydrated, the apparatus is out of operation.

It is within the concept of the present invention to provide a continuous method of effectively dehydrating the material so that there is no period in which the apparatus is out of use. A method of dehydrating the material may be carried out in an apparatus such as shown in Figures 3 to 6 of the drawings. As illustrated in these figures such an apparatus comprises an annular tunnel 13 through which a material to be dehydrated and a dehydrating agent are moved.

In order to move the material to be dehydrated and the dehydrating agent through said tunnel, carrier racks 14 and 15 are provided. These racks are in the form of annular rotatably mounted carriers. As illustrated, the rack 14 comprises an inner annular angle member 16 which is connected by a plurality of radially extending angle irons 17 with an outer annular angle member 18. The composite rack 14 is supported upon a plurality of rollers 19 mounted on spindles or stub shafts carried by the inner and outer annular walls of the tunnel 13. In addition, the inner wall of the tunnel is provided with a plurality of rollers 20 which are rotatably mounted on vertically extending shafts for spacing the racks 14 within the tunnel 13.

For effecting rotation of the rack within the tunnel, a driver such as an electric motor 21 is supported and has its shaft extending through the inner wall of the tunnel 13. On the shaft of the motor is mounted a drive wheel 22 which frictionally engages the inner annular angle member 16 of rack 14 to cause said rack to be moved. In place of the friction drive, angle member 16 may be provided with rack teeth which mesh with a gear mounted on the shaft of the motor 21 instead of the friction wheel 22.

The rack 15 is constructed similarly to rack 14 in that it is provided with inner and outer annular angle members 23 and 24 respectively which are connected by radially extending angle irons 25. The rack 15 is supported upon rollers 26 corresponding to the rollers 19 and is centered relatively to the tunnel 13 by means of the rollers 27 mounted on the vertical shafts which are supported by the inner wall of the tunnel 13. The lower rack 15 may be driven by a motor 28 the shaft of which carries a friction driven wheel 29 engaging the inner annular angle member 23. As in the case of the drive from motor 21 a gear and rack or other type of connection between the shaft of the motor and the annular angle member 23 may replace the friction drive.

As more clearly shown in Figure 4 of the drawings, the upper rack 14 has mounted thereon a plurality of trays 30 which are adapted to be removed therefrom and replaced by other trays during the course of the process. Trays 30 may be provided with imperforate side walls and with perforated or screen like bottom walls 31 on which the vegetable or other material to be dehydrated is supported.

The lower rack 15 is adapted to carry a plurality of trays 32 provided with perforated or screen like bottom walls 33 on which is supported the silica gel or other dehydrating agent.

As shown in Figure 4, it will be noted that the outer annular angle member 18 of rack 14 is turned downwardly so as to permit the easy removal and replacement of trays 30 on said rack. As the silica gel or other dehydrating agent carried by the trays 32 need not be removed periodically as is the case of the trays 30 both of the annular angle members 23 and 24 of rack 15 may face upwardly.

In order to effect the circulation of a gaseous moisture carrier through the material to be dehydrated and the dehydrating agent as said material and dehydrating agent are moved through the wall a plurality of dehydrating zones 34 are spaced circumferentially of the tunnel and means are provided for creating separate circulations of the gaseous moisture carrier through each of said zones.

For this purpose, blowers 35 are provided which are driven by motors or other sources of power 36. Each of the blowers 35 is provided with an inlet duct 37 which connects near the bottom of the tunnel as illustrated in Figure 4 of the drawings. The discharge of the blower 35 is connected by a duct 38 with the upper portion of the tunnel 13.

Each of the zones 33 is separated from adjacent zones by upper and lower partitions or baffles 39 and 40 respectively. In this conection, it will be noted from Figures 4 and 5 that the racks 14 and 15 are closely spaced and that the upper baffle 39 extends downwardly from the roof of the tunnel 13 to a point just sufficient to clear the tops of the trays 30. The lower baffle 40 extends upwardly from the bottom of the tunnel 13 to a region just below the bottom of the lower rack 15. With this construction, the circulation of the gaseous moisture carrier through each of the zones 34 will be practically independent of the circulation through adjacent zones. While there may be a slight spill over from one zone to another, this is not sufficient to seriously affect the operation of the apparatus. Referring to Figures 3 and 5, it will be observed that the ducts 37 and 38 connecting the intake and discharge of the blower 35 with the tunnel 13 flare outwardly from the blower so as to equally distribute the gaseous medium evenly throughout the dehydrating zone. This insures an even flow and distribution of the moisture carrier through the material to be dehydrated and the dehydrating agent.

In accordance wtih the present invention, means are also provided for reactivating the gel or other dehydrating agent in a substantially continuous manner. As illustrated in Figure 3 of the drawings, the reactivation takes place in the reactivating zone which comprises a portion of the length of the tunnel 13 and is separated from the dehydrating zones by partitions 39 and 40 in substantially the same manner as the adjacent dehydrating zones are separated. In the reactivation zone, hot, dry gases, such as combustion gases or a heated stream of air is passed in contact with the silica gel or other dehydrating agent, and removes from said silica gel or dehydrating agent the moisture absorbed thereby in the dehydrating zones. For this purpose, a blower 41 is provided for forcing a flow of air through a heater 42 in which the air is heated by a burner 43. The exhaust or flue gases may be discharged through a stack 44 and the heated air forced into the distributing conduit 45 which communicates with the portion of the tunnel 13 constituting the reactivation zone. After contacting the dehydrating agent and removing the moisture therefrom, the air which was introduced by means of the blower 41 may be discharged into the atmosphere or dried and recirculated.

In operation of the process of the present invention in an apparatus such as illustrated in Figure 3, trays of vegetable or other material to be dehydrated are introduced into the tunnel on the rack 14 at a position immediately adjacent the reactivation zone. The rack 14 with the trays of vegetable or other materials thereon moves clockwise as indicated by the arrow in Figure 3. Simultaneously with the travel of the vegetable or other material in the trays 30 on rack 14, the trays 32 containing silica gel or other dehydrating agent are moved in a counter-clockwise direction as indicated by the arrow in Figure 3. The trays containing the silica gel or other dehydrating agent need not be removed from the rack 15 carrying the same as they are passed through the reactivation zone.

After the trays containing the material to be dehydrated have passed through the tunnel 13 from one side of the reactivation zone to the other in a direction counter to the travel of the dehydrating agent, said trays are removed as indicated.

By moving the vegetable or other material to be dehydrated through the tunnel 13 in a direction countercurrent to that of the dehydrating agent, the fresh material is first subjected to silica jel or other dehydrating agent which has taken up a considerable amount of moisture. As the material to be dehydrated progresses through the tunnel 13, it will successively be moved into a position adjacent a portion of the dehydrating agent which contains less and less moisture. Just before the material to be dehydrated is removed from the tunnel, it is brought into close proximity to dehydrating agent which has been freshly reactivated; that is, just as it leaves the reactivation zone. As a result of this procedure, highly efficient dehydration of the vegetable or other material is effected.

In passing through the tunnel, the silica gel or other dehydrating agent and the vegetable or other material to be dehydrated may be moved at substantially the same speed or at different speeds. For instance, the adsorption and activation cycle for the silica or other dehydrating agent may be one hour, whereas the drying cycle for the vegetable or other material to be dehydrated may be five or six hours. By a differential speed of travel of the material to be dehydrated and the dehydrating agent through the tunnel 13, an effect is obtained which is equivalent to that of maintaining a large quantity of gel or other dehydrating agent in close proximity to a smaller quantity of vegetable or other material to be dehydrated. The gas to be used as the moisture carrier which is circulated in contact with the dehydrating agent and the material to be dehydrated will depend upon the particular type of material to be dehydrated. Air is a gas which is suitable for this purpose in many instances. In other cases, air mixed with carbon dioxide will be found advantageous. In other specific instances, it may be found advisable to employ nitrogen, carbon dioxide, or other inert gases. In some instances, it may be found advisable to add to the moisture carrying gas a treating gas for modifying the condition of material undergoing dehydration. In this connection ethylene or other organic compounds may be employed which will favorably affect the color or flavor of the material being dehydrated. The organic treating gases would be non-absorbed by the silica gel because of the preferential adsorbing characteristic of silica gel for water vapor.

The temperature of the gaseous moisture carrier which is circulated in contact with the dehydrating agent and the material to be dehydrated will vary depending upon the material being treated, and will depend upon conditions of operation as well. By arranging the trays of material to be dehydrated in close proximity to the dehydrating agent, the drying may be effected without any increase or decrease in temperature. This is due to the fact that heat of adsorption of water vapor in the gel is approximately the same as the heat of vaporization required to remove moisture from the material to be dehydrated. This enables the drying to be carried out under substantially isothermal conditions at any predetermined temperature without any temperature rise or fall.

The pressure of the gaseous moisture carrier may vary from a sub-atmospheric pressure of 2 to 5 mm. Hg. to atmospheric pressure. In many installations, atmospheric pressure will be preferable because of the simplicity of the apparatus and the ease of control.

While in Figures 3 to 6 of the drawings only two racks 14 and 15 have been shown, one for the material to be dehydrated, and the other for the dehydrating agent, it is within the concept of the present invention to employ a plurality of such racks. In this instance, the racks carrying the trays containing the dehydrating agent would alternate with the racks carrying the trays containing the material to be dehydrated.

One of the outstanding advantages of the present invention is that the dehydrated food product obtained according to the present invention, upon hydration with water, will resume the original shape, color, and flavor. This is of considerable importance, because the palatability of the product dehydrated in accordance with the present invention is much superior to that dehydrated with material which would detrimentally affect the shape, color, or flavor. Furthermore, the dehydrating agent used in carrying out the present invention will take up water but will not take up the volatile flavoring substances of the food product. By reason of the closed circuit system in conjunction with the particular dehydrating agent employed, there is no escape of the volatile flavor elements, whereas, in other drying processes, these volatile compounds escape to a very large extent.

Because of the fact that the drying can take place at a fixed temperature during the entire dehydrating period by reason of the balance of the heat generated by the adsorption with the heat required for evaporation of moisture, the temperature can be fixed at any suitable low point to prevent the decomposition of heat sensitive organic compounds, as for instance, vitamins, tastes, and flavors.

From the foregoing description, it will be appreciated that the present invention provides an improved process of dehydrating vegetable and other moisture-containing material by means of silica gel or other dehydrating agents having characteristics similar thereto.

While, in the foregoing description, reference has been made to particular materials, procedural steps, apparatus, and conditions, it should be understood that the invention is not specifically limited thereto but may be varied to include equivalent materials, steps, and apparatus.

I claim:

A method of dehydrating vegetable and other moisture-containing material without removing volatile flavoring substances therefrom comprising moving silica gel in an endless path through a plurality of serially positioned dehydrating zones and an activating zone, moving material to be dehydrated along a path similar to and in close proximity to said path through said dehydrating zones, countercurrently to the movement of the silica gel, circulating a stream of a gaseous moisture carrier through each of said dehydrating zones in a direction transversely to the directions of movement of the material and silica gel alternately in contact with the silica gel and the material to be dehydrated to transfer moisture from the material to the silica gel, passing a hot dry gas through the reactivating zone in a direction transversely to that of the movement of the silica gel therethrough to reactivate the silica gel, said material to be dehydrated being introduced into the path at a region between the last dehydrating zone through which the silica gel has passed and the activating zone so that the material will first be brought into proximity with silica gel just prior to activation of said gel, and said material being removed from said path after having passed in close proximity to freshly activated silica gel through the dehydrating zone into which the silica gel is first passed after activation.

MARK SHOELD.